3,036,043
PROCESS FOR PREPARING HIGH MOLECULAR LINEAR POLYESTERS FROM POLYMETHYLENE GLYCOLS AND ESTERS OF BENZENE DICARBOXYLIC ACIDS
Hans Gruschke, Bad Soden (Taunus), and Heinz Medem, Offenbach (Main), Germany, assignors to Farbwerke Hoechst Aktiengesellschaft vormals Meister Lucius & Brüning, Frankfurt am Main, Germany, a corporation of Germany
No Drawing. Filed Nov. 12, 1958, Ser. No. 773,181
Claims priority, application Germany June 24, 1955
6 Claims. (Cl. 260—75)

This application is a continuation-in-part application of application Serial No. 590,086, filed June 8, 1956.

It has already been proposed to prepare polyesters from diols and aromatic dicarboxylic acids by reacting a diol with an ester from a dicarboxylic acid and a monohydric alcohol in the presence of a catalyst, the diols being used in excess.

As catalysts it has been proposed to use metals, such as sodium, potassium, lithium, calcium, magnesium, zinc, cadmium, manganese, iron, cobalt, nickel, tin, lead and bismuth as well as the carbonates, oxides and alcoholates of alkaline and alkaline earth metals either alone or in combination.

In U.S. Patent 2,470,651 zinc chloride, aluminum chloride, antimony chloride, antimony fluoride and boron fluoride are used as catalysts which must be added in great amounts (up to 1 mol percent) to produce an effect whatsoever.

As catalysts there may also be used the oxides, chlorides, sulfates, acetates, alcoholates and salts of higher aliphatic or aromatic monocarboxylic acids of the elements of the third, fourth and second sub-group of the periodic system, which are added in a relatively high proportion (up to 0.5 mol percent).

Now we have found that higher molecular linear polyesters, such as polyethylene terephthalate, can be obtained by reacting a diol and an ester of a dicarboxylic acid with a monohydric alcohol in the presence of an alkaline and/or alkaline earth metal salt of silicic acid, stannic acid, selenic acid, phosphoric acid and tungstic acid or a mixture thereof in a proportion of 0.005 to 0.05 mol percent, calculated upon the dicarboxylic acid ester used. The process of this invention offers the particular advantage of enabling a considerably smaller proportion of catalyst to be used than in the known processes.

In carrying out the process of this invention the alkali silicates, preferably $Na_2Si_2O_5.2H_2O$, sodium selenate, potassium selenate, sodium stannate, barium stannate, secondary magnesium-ortho-phosphate, calcium phosphate or sodium tungstate have proved to be especially valuable catalysts. The aforesaid alkali metal and alkaline earth metal salts may also be used in the form of a mixture in a desired concentration. As catalyst there may be used, more especially, a mixture comprising 2 or 3 components of alkali metal and/or alkaline earth metal salts with the aforesaid acids.

The process of this invention can be carried out with advantage by adding the catalyst, prior to the re-esterification, to the esters and diols to be condensed. As esters of dicarboxylic acid there may be used esters of terephthalic acid, isophthalic acid, phthalic acid, sebacic acid, adipic acid, succinic acid with monohydric alcohols containing 1 to 6 carbon atoms, such as methyl alcohol, butyl alcohol or isohexyl alcohol. As diols are concerned, for example, ethylene glycol, propylene glycol, butane-1,4-diol or hexane-diol. The reaction mixture is heated under normal conditions, for example at 120 to 300° C., so that the alcohol separated from the reaction mixture is withdrawn from the reaction zone. The products obtained in the first reaction zone, i.e. the diol esters of terephthalic acid, can be converted in the usual manner into high molecular fiber-forming products, as it is described for example in German Patent 818,117.

The following examples serve to illustrate the invention but they are not intended to limit it thereto:

*Example 1*

150 grams of dimethylterephthalate, 120 grams of ethylene glycol and 0.04 gram of sodium silicate are heated to 190° C., while stirring, with distillation of methanol. The separated methyl alcohol has distilled over after 6 hours, during which time the interior temperature is slowly increased to 210° C. The reaction mixture is then introduced into a vacuum-tight vessel provided with a gas supply line, a stirrer and a descending cooler with a receiver; while injecting nitrogen, the temperature of the oil bath is kept at 250° C. and the vacuum prevailing in the vessel is adjusted within 2½ hours from 760 mm. to a complete vacuum (0.3 mm.). The oil bath is heated to 278° C. and kept at that temperature for 3 hours during which time the reaction mass becomes increasingly viscous. The melt so produced enables the production of fibers which are capable of being stretched subsequently.

*Example 2*

150 grams of dimethylterephthalate and 120 grams of ethylene glycol are mixed with 0.04 gram of sodium stannate and the reaction mixture is condensed as described in Example 1. The resulting product has the K-value 55, determined in a mixture of phenol and tetrachlorethane; the molten product can be spun into fibers which, after having been stretched, exhibit a very good tensile strength.

*Example 3*

150 grams of dimethylterephthalate and 120 grams of ethylene glycol are mixed with 0.03 gram of sodium silicate and 0.02 gram potassium selenate. The reaction mixture is condensed as described in Example 1. The molten product of polyethylene terephthalate so produced can be spun into fibers which, after having been stretched, exhibit a very good tensile strength.

If to the said mixture of sodium silicate and 0.02 gram potassium selenate magnesium phosphate is added as a third component the fibers of polyethylene terephthalate obtained as described in Example 1 show also a very good tensile strength.

*Example 4*

150 grams of dimethylterephthalate and 120 grams of ethylene glycol are mixed with 0.03 gram of calcium phosphate and 0.02 gram of barium stannate. The reaction mixture is condensed as described in Example 1. The molten product of polyethylene terephthalate so obtained can be spun into fibers which, after having been stretched, exhibit a very good tensile strength.

*Example 5*

150 grams of dimethylterephthalate and 120 grams of ethylene glycol are mixed with 0.03 gram of sodium tungstate and 0.03 gram of magnesium phosphate. The reaction mixture is condensed as described in Example 1. The molten product of polyethylene terephthalate so obtained can be spun into fibers which, after having been stretched, exhibit a very good tensile strength.

We claim:

1. In a process for preparing a high molecular weight linear polyester from a polymethylene glycol containing from 2–6 carbon atoms and a diester of terephthalic acid with a monohydric alcohol containing from 1–6 carbon atoms, the step which comprises condensing the components in the presence of an inorganic catalyst selected from the group consisting of alkali metal silicates, stannates, selenates and tungstates, alkaline earth metal stannates, and mixtures thereof, said catalyst being used in a proportion of from 0.005–0.05 mol percent calculated upon said terephthalic acid diester, heating the reaction mixture to a temperature above the boiling point of the monohydric alcohol, removing said alcohol, further heating said mixture under reduced pressure at a temperature above the melting point of the resulting polyester, and maintaining the heating until a stage is reached at which fibers removed from the resulting mass can subsequently be stretched.

2. A process as in claim 1 wherein said inorganic catalyst is sodium silicate.

3. A process as in claim 1 wherein said inorganic catalyst is sodium stannate.

4. A process as in claim 1 wherein said inorganic catalyst is a mixture of sodium silicate and potassium selenate.

5. A process as in claim 1 wherein said inorganic catalyst is barium stannate with which calcium phosphate is admixed in a weight ratio of 2 parts stannate to 3 parts phosphate.

6. A process as in claim 1 wherein said inorganic catalyst is sodium tungstate with which magnesium phosphate is admixed in an about equal weight ratio.

References Cited in the file of this patent
UNITED STATES PATENTS

| | | |
|---|---|---|
| 2,249,950 | Fuller | July 22, 1941 |
| 2,465,150 | Dickson | Mar. 22, 1949 |
| 2,465,319 | Whinfield et al. | Mar. 22, 1949 |
| 2,720,507 | Caldwell | Oct. 11, 1955 |